United States Patent [19]

Petrecca et al.

[11] Patent Number: 5,781,894
[45] Date of Patent: Jul. 14, 1998

[54] METHOD AND SYSTEM FOR ADVERTISING ON PERSONAL COMPUTERS

[76] Inventors: Anthony Petrecca, 142 Washington Ave.; Michael Kollar, 2400 Hudson Terrace 2N, both of Fort Lee, N.J. 07024; Robin Whitney, 1127 Washington St., Hoboken, N.J. 07030

[21] Appl. No.: 514,223

[22] Filed: Aug. 11, 1995

[51] Int. Cl.$^6$ .................................................. G06F 17/60
[52] U.S. Cl. ........................................................ 705/14
[58] Field of Search .................................. 395/214, 216, 395/205; 705/5, 14, 16

[56] References Cited

U.S. PATENT DOCUMENTS

| | | | |
|---|---|---|---|
| 5,105,184 | 4/1992 | Pirani et al. | 345/115 |
| 5,199,066 | 3/1993 | Logan | 380/4 |
| 5,305,195 | 4/1994 | Murphy . | |

OTHER PUBLICATIONS

Yamada, Ken, Developers eye online registration options, Computer Reseller News, pp. 2, Jun. 5, 1995.

*Primary Examiner*—Gail O. Hayes
*Assistant Examiner*—Barton L. Bainbridge
*Attorney, Agent, or Firm*—Eliot S. Gerber

[57] ABSTRACT

An advertising system to be used with personal computers which enables sponsors to present advertisements or commercials to a user during periods of waiting-time which are inherent in normal computer use. A segment of a software product contains one or more sponsors' audio, visual, or multi-modality messages. The advertising system chooses one of these messages and presents it to the user of the computer during the times that the user is not normally able to use the keyboard of the computer because information is being loaded up or sent out. Such times occur during the start-up of a program or during the sending of information from the computer to a peripheral device such as a printer, modem, or fax. The advertisement, or sequence of advertisements, may be chosen based upon the amount of time which the computer will need to achieve a task before being ready for new input from the user. A system is disclosed in which the user is allowed to choose to activate an advertising system in return for receiving some type of compensation.

14 Claims, 3 Drawing Sheets

1

METHOD AND SYSTEM FOR ADVERTISING ON PERSONAL COMPUTERS

FIELD OF THE INVENTION

This invention relates a method and system in computer systems and methods and more especially for presenting an advertising message, or set of advertising messages, to users of personal computers ("PC") without inconveniencing the user.

BACKGROUND OF THE INVENTION

In the system and method of the present invention, use is made of the fact that many computer tasks on personal computers (PC) create a period of "waiting time" in which the computer is not able to accept new input from the user. When these waiting times occur, the computer usually informs the user that it is not ready to go to the next task by presenting a message such as "Sending text to spooler," "Working," "Waiting," "Processing," or "Loading." These messages occur as text somewhere on the screen, or commonly are accompanied by a pop-up window which draws the attention of the user to the message. In some software packages an image of a clock, icon, company logo, or hourglass may appear during the waiting time and flash or rotate intermittently to inform the user that the computer is processing and the waiting period is still transpiring.

These waiting periods also occur on computer network systems. In Murphy, U.S. Pat. No. 5,305,195, an advertising system is described for interactive network systems having a plurality of remotely located terminals of which automatic teller machines (ATM's) are an example. Murphy provides an advertising system in which compressed versions of full motion video sequences are transmitted by the network to individual terminals where they are stored on a storage medium such as a hard drive. During the waiting time, which is inherent in the operation of computer network systems, these video advertisements are loaded from the hard disc and displayed on the monitor of the remote terminal.

SUMMARY OF THE INVENTION

In the system and method of the present invention the computer user is presented with a sponsor's advertising message, preferably a picture or animated frames of pictures, instead of the text messages or logo that the software program normally presents during the waiting period. Preferably the advertsing message is presented across the entire display of the computer monitor. Alternatively, the present system and method may display the advertising message concurrent to the normal text message or logo, in the case where the advertising message utilizes only a partial section of the screen display or the advertising message may consist of only an audio message.

The advertising system and method of the present invention allows commercial sponsors to reach consumers who are not on network systems. Further, a method for activating the advertisements is proposed which relies on an activating system which gives the consumer the choice to view the advertisements in return for compensation. The present advertising system and method an improvement over Murphy because Murphy may interrupt an advertising message in the middle of its presentation when the waiting period is shorter than the duration of the advertisement. The present advertising system and method provides a method for estimating the length of the waiting period so that an advertisement can be chosen which fits into this waiting period.

BRIEF DESCRIPTION OF THE DRAWINGS

The present invention is illustrated by way of example and not limited in the figures of the accompanying drawings within which like references indicated similar elements and in which.

DETAILED DESCRIPTION OF THE INVENTION

Figure 1:
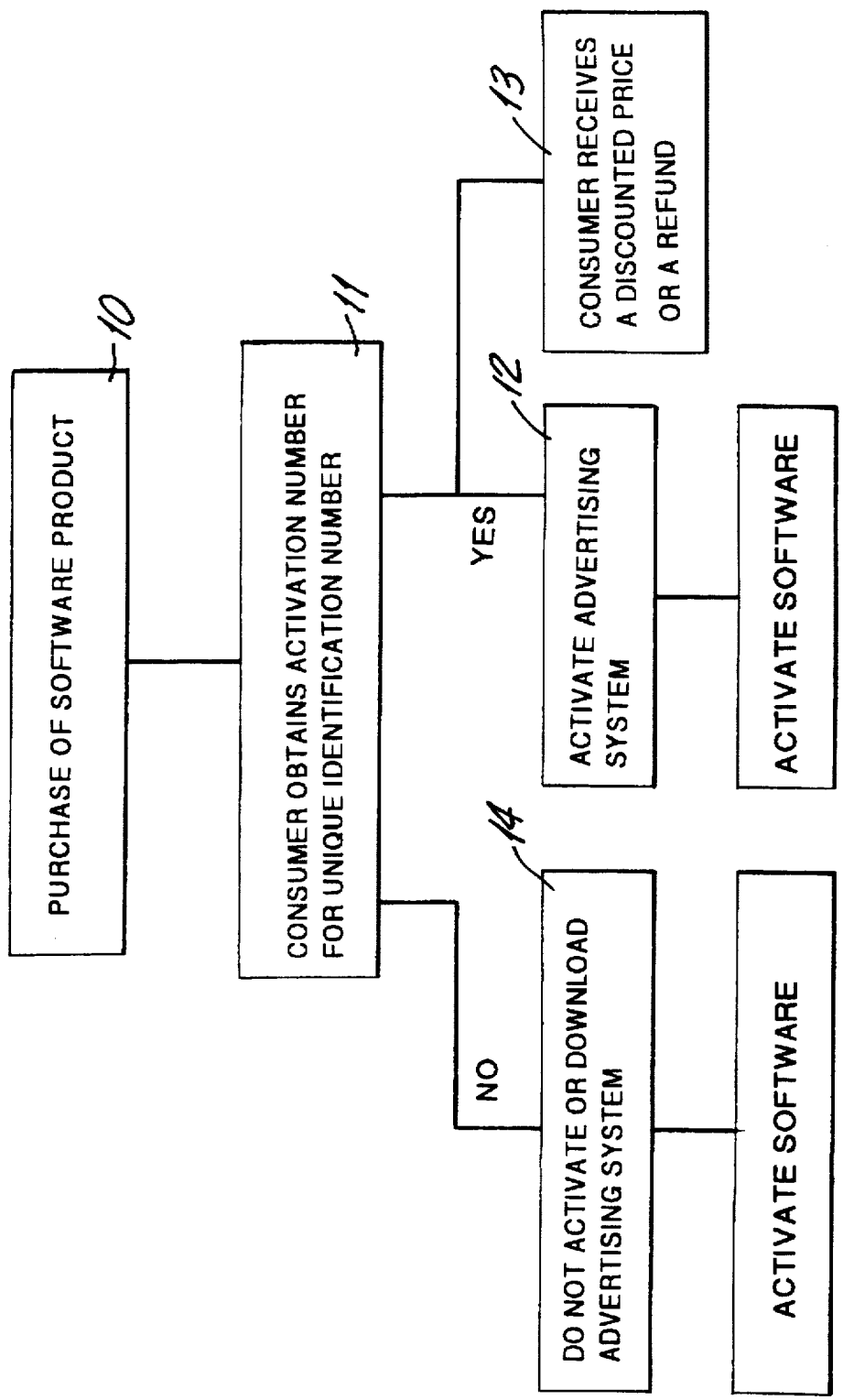
FIG. 1. is a flow diagram of a logic.

The present advertising system and method will appeal to software companies who offer software products at a discounted rate, or free of charge, and to computer companies who install such software into new computers. Sometimes the versions that they offer are "bare bones" versions, or earlier versions of their latest software, which are intended to give the user an idea of what it is like to use their product. Currently many companies such as Prodigy (TM) or Quicken (TM) enter into this type of arrangement so that their software is available to the purchaser of the computer with the purchase of a new computer. This type of arrangement benefits the computer manufacturers and the PC customers because computer manufacturers can offer their customers attractive software for free, or for very little additional cost, with the purchase of their personal computer system. The software companies hope to benefit from this arrangement by gaining loyal users who will choose their software products, over those of their competitors, when they decide to purchase future versions of the software. The value of having computer users become used to a certain software package is seen as so valuable that software companies spend considerable amounts of money in order to advertise free versions of their software in the hopes of capturing future customers. It is becoming well accepted that once a customer uses a particular type of software product such as a particular word processor system, or buys a Macintosh (TM) or IBM (TM) system, it is very difficult to persuade that customer to switch to a different system.

By making a deal with a commercial sponsor, or set of sponsors, to incorporate advertising messages into software products, software companies could obtain a source of profi as they would charge for placing such a message on their software product. Software companies would also be able to offer their products at a decreased price.

In one embodiment of the advertising system and method the computer company incorporates a subroutine into their software product that identifies the existence of a waiting period and calls up 1 or more advertising messages from a set of advertising messages whose presentation may be short, e.g., 1 second, or much longer, e.g., 15 seconds or more, and which are stored on the same storage device as the software product. The presentation of these advertising messages conforms to the sponsors wishes, for example the presentation of the advertising messages could be controlled so that different messages are displayed in a random sequence. Alternatively, rather than being incorporated as a subroutine of the software product, the advertising system and method exist as an independent software application which runs in the background similar to the strategy of the popular screen savers. The advertising system and method is configured to over-ride the screen saver program and present advertising messages after a specified time period has transpired without inputt from the user. Alternatively, the advertising system and method is configured to detect waiting time periods and to present the advertising messages only during this time.

The advertising system and method of the present invention may also be configured so that it controls the number of presentations of a certain advertising message. For example, if a movie studio chooses to advertise several upcoming movies on game software and expects these movies to be released on a series of separate dates, the advertising program begins to present the advertisement of a particular movie starting 1 month before it is released and terminates the presentation of that particular advertisement 2 months later.

Alternatively, the advertising system could keep track of the number of times that it presents a particular advertisement and be configured to stop presenting an advertisement after a certain number of presentations.

The advertising system and method of the present invention may be configured so that the advertising message or series of advertising messages which are selected from a group of such advertising messages based on their length relative to the length of the waiting time. In one embodiment of the advertising system, for example, the advertising system is incorporated by a software company that produces accounting or investing software. When the user decides to make a printout of a particular file, the advertising system calculates the approximate waiting period using the number of pages to be printed, the font style, and the system speed in making an estimation of the waiting period. Since the software company that manufactures the accounting or investing software would configure it to work with the advertising system, the software would be designed to send information concerning the number of pages and the font type to the advertising system before it sends information to the printer buffer.

In another embodiment of the advertising system and method of the present invention as shown in FIG. 1, a consumer purchases a new computer or software product 10, which contains both software programs and advertising messages of the present invention. When the user first uses, or installs, the software product 10, a pop-up window appears on the screen and displays a toll-free phone number, a unique identification number 11, and an information field which requires that the user input an activation number in order to use the program. When the consumer calls this toll-free number an operator, or an automated system, asks for the unique identification number 11 which appeared on the user's screen. The user is then queried as to whether the user wants to use the software with, or without, the advertising system. If the user chooses to activate the advertising system and method 12 a code number is given to the user 13 and refund check is issued to the user 13. If the user 13 does not wish to activate the advertising system and method 12 a different activation number is given and no refund check is issued. For each unique identification number there exists only two activation numbers, one which activates the advertising system and method one which does not. If a user obtains an activation number which activates the software product 10 but does not activate the advertising system and method 12, that activation number could not be used by different user who has also bought the software product because each purchase of the software product requires activation numbers that are matched to unique identification numbers.

Currently some software products offer the user the ability to automatically register his purchase through the computer's modem. The above process may be facilitated by occurring via modem; rather than requiring the user to call a number and talk to an operator or work through an automated system which requires the user to push buttons on the telephone in response to prerecorded questions.

In another embodiment of the advertising system and method of the present invention a software company issues two activation disks to the distributor of its software. One of the disks activates the advertising system and the other merely contains the unique activation information which is needed the first time the consumer uses the software and which permits future use of the software product. The distributor charges the customer a reduced fee if the customer opts for activating the advertising system and gives the consumer the appropriate disk.

In another embodiment of the advertising system and method of the present invention a software company can issue a card which contains two activation numbers. These numbers are covered by an opaque material, similar to that utilized by some types of lottery games in which the consumer must rub off the opaque material in order to see the information written below. The distributor rubs off the opaque material over the appropriate activation number and then returns the card to the software company. When the software company receives a card from the distributor it checks the number which was exposed when the opaque material was rubbed off against a list. The software company then issues a refund to the distributor if the exposed activation number is one that activates both the software product as well as the advertising system and method.

In another embodiment of the advertising system and method of the present invention a charging system, such as an electronic or computer controlled cash register, is configured so that when a purchase is made the charging system automatically accesses an appropriate activation number based on the charged price and the unique identification number of the product. The unique identification number can be the serial number of the product. The system is able to automatically access the appropriate activation number by utilizing either a database which is stored in the charging computer and or via modem where the information is sent from a remote computer.

The advertising system and method of the present invention may be configured so that if a user chooses not to activate the advertising message system the message material is not transferred to the computer during the instillation of the software product. Alternatively, if the software is already installed on the storage medium of the computer, as may occur when a consumer purchases a new computer that comes "loaded", the choice of not to activate the advertising system activates a routine that erases the message material so that it does not take up space on the user's hard drive.

Figure 2:
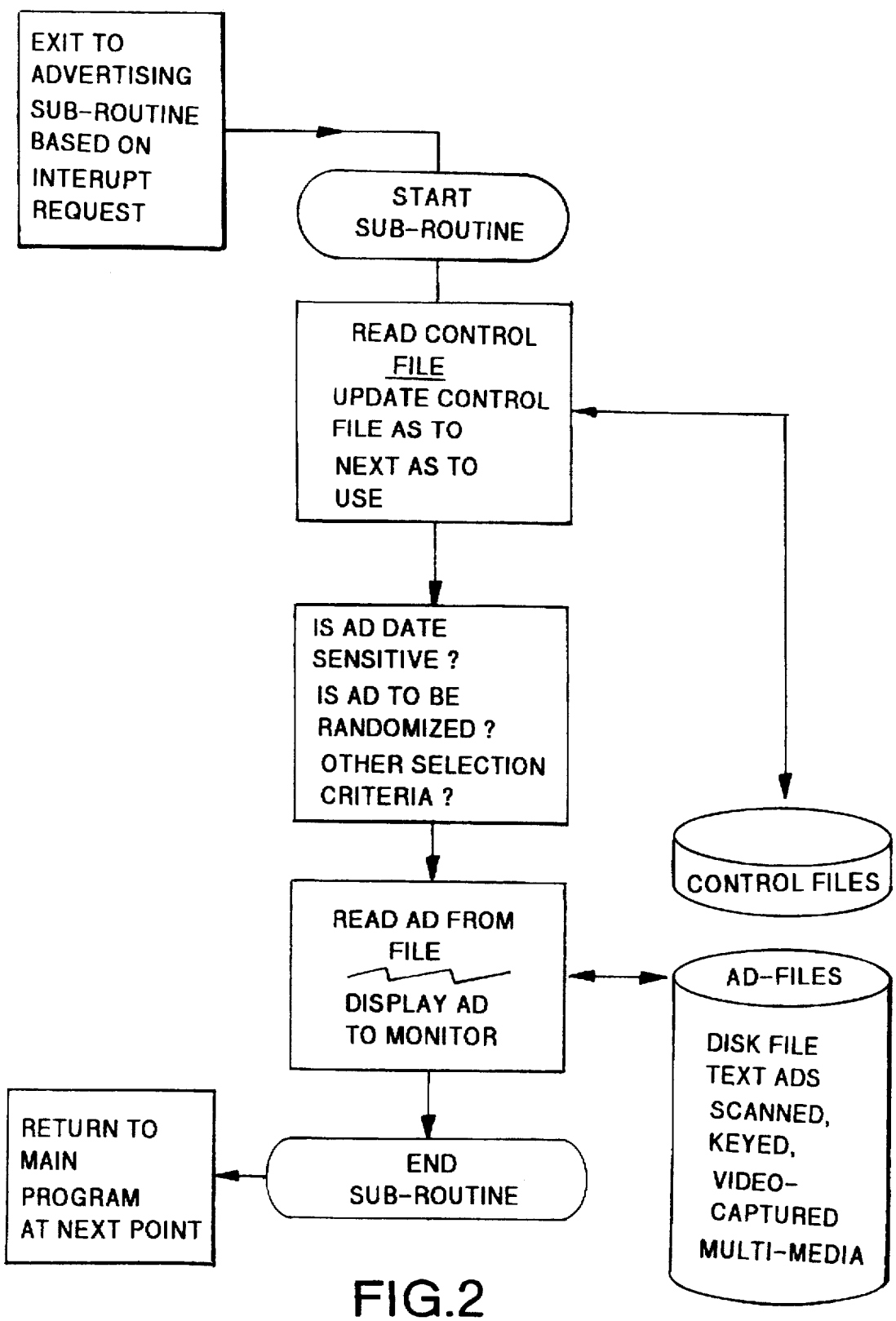
FIG. 2. is a flow diagram of a computer software program.
Figure 3:
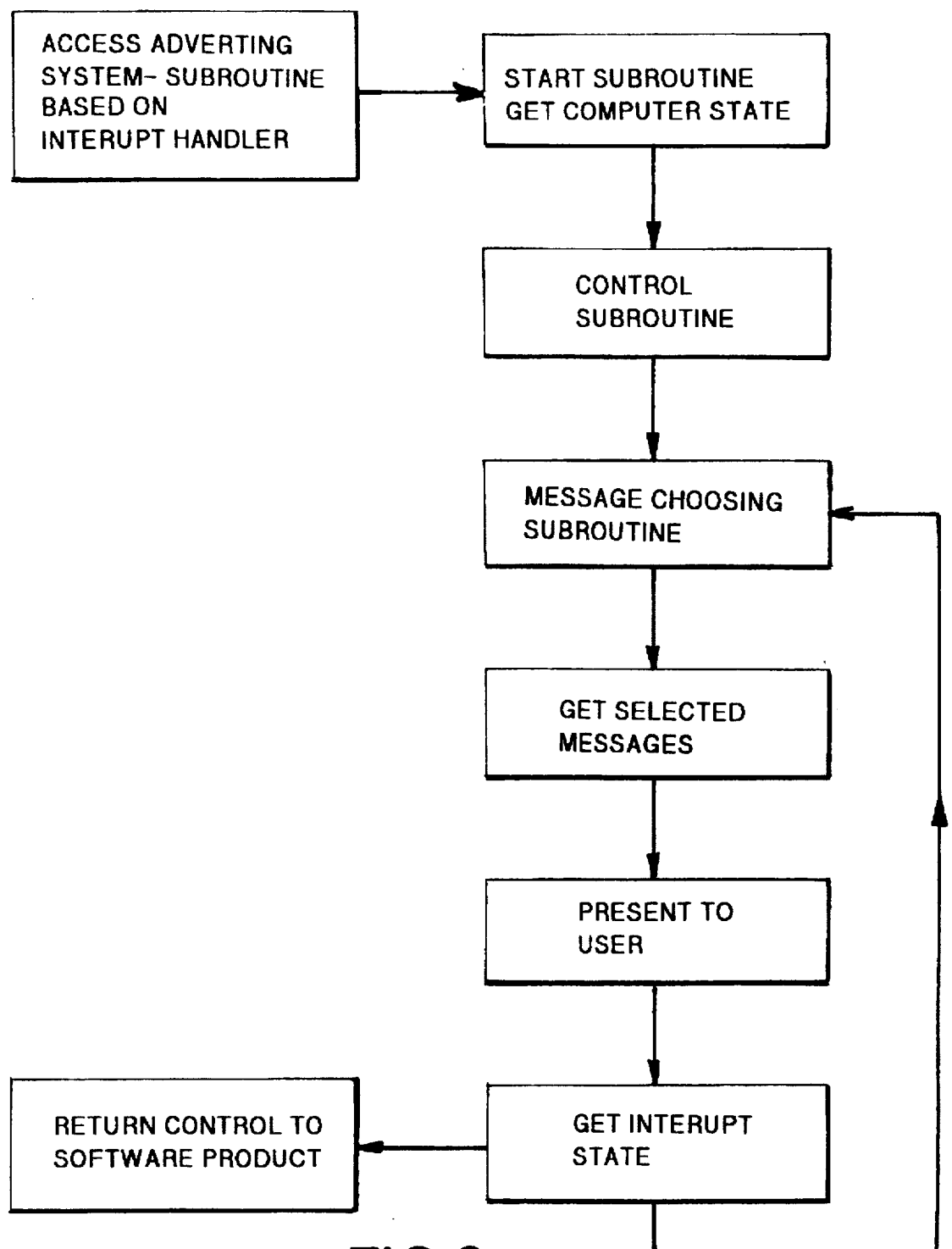
FIG. 3. is a flow diagram of an alternative computer software program.

When a user has obtained a discounted price both the software product 15 and the advertising system 14 have been activated and must interact appropriately on the personal computer system. As shown in FIG. 2, when appropriate interrupt requests are made the computer accesses the advertising system 16. At the start of the advertising presentation subroutine 17, information on the computer state such as the predicted length of the waiting time and the current date are accessed and sent to the subroutine which reads the control specifications 18. The control specification subroutine 18 which reads the control specifications may be in a file which is loaded into the computer's memory. Alternatively the subroutine 18 may be loaded into the conputer's memory each time the user runs the software product or at start-up time. The subroutine contains information about the advertising messages that are available such as their respective durations, the dates during which each can be shown, the number of times they have been shown, and other selection criteria. Based upon the computer state 17 and the control specifications 18 the appropriate advertising message or set of advertising messages are chosen in the advertising message choosing subroutine 19. The selected advertising messages are read 20 from the advertising system advertisement database which may be contained on any of the computer's storage media. The set of selected advertising messages which may be only one advertising message is presented to the user 21 either on the display monitor, computer speaker, or both. After each individual message is presented the state of the interrupt handler is querried 22. If the waiting period is still occurring and all the pre-selected advertisements have been shown then the advertising system returns to 19.

What is claimed is:

1. An advertising system for personal computer (PC) systems comprising:

memory digital data storage means for storing one or more software programs and at least one advertising message and message presentation controller means for determining if a computer will present said advertising message to a user wherein said means for determining if the computer will present said advertising message comprises a unique identifier number associated with said one or more software programs and also associated with two activation numbers, one of which activates both said software programs and said advertising message, and one of which activates only said software programs.

2. A method of informing a consumer of the activation number of claim 1 in which the user contacts the software company by phone and receives an activation number in accordance with the user's answers to a set of questions.

3. A method of informing a consumer of the activation number of claim 1 in which said advertising system presents a checklist and short answer questionnaire to said user on a monitor of a computer and transmits said user's responses to a separate computer by means of a modem, said separate computer sending back one of the two said activation numbers.

4. A method of informing a consumer of the activation number of claim 1 in which said activation number is issued by a cash register device at time of purchase, said activation number being determined by the amount charged to the consumer for the software product.

5. A cash register device as described in claim 4 wherein said database is located in a remote computer which is accessed by said cash register device by means of a modem.

6. A cash register device for issuing the activation number of claim 1 comprising a cash register means and means to access an appropriate activation number for a product based upon the unique identification of said software product and a selling price from a database containing said unique identification numbers each of which is associated with two activation numbers one of which activates both said software products and said advertising message and one of which activates only said software products.

7. An advertising system for personal computer (PC) systems comprising:

memory digital data storage means for storing one or more software programs and at least one advertising message and, message presentation controller means for determining if a computer will present said advertising message to a user wherein said message presentation controller means presents said advertising messages only during waiting times while documents generated by the PC are being printed.

8. An advertising system for personal computer systems according to claim 7 wherein said commerical messages are sound files that are presented to the computer user by means of the audio system of the computer.

9. An advertising system for personal computer systems according to claim 7 wherein the message presentation and controller means comprises a subroutine of computer programming code which is part of said one or more software programs.

10. An advertising system for personal computer (PC) systems according to claim 7 wherein said messages are sound files that are presented to the user by means of the audio system of the computer.

11. An advertising system for personal computer (PC) systems according to claim 7 wherein the message presentation means comprises a subroutine of computer programming code which is part of said one or more software programs.

12. An advertising system for personal computers (PC) systems according to claim 7 and a computer algorithm which automatically determines whether a particular advertisement will be presented to a viewer, the algorithm being based on one selected from the group of random presentation, counting the number of presentations of each advertising message and a calendar date.

13. An advertising system for personal computer (PC) systems according to claim 7 and a computer algorithm which provides an estimate of the approximate duration of said waiting times.

14. An advertising system for personal computer (PC) systems as in claim 13 wherein said computer algorithm which provides an estimate of the approximate duration of said waiting times is based on the computational speed of said personal computer and the size of the data to be processed.

* * * * *